Aug. 24, 1937.　　　　　C. A. WARG　　　　　2,091,192
STOKER CONTROL
Filed July 29, 1932　　　7 Sheets-Sheet 1
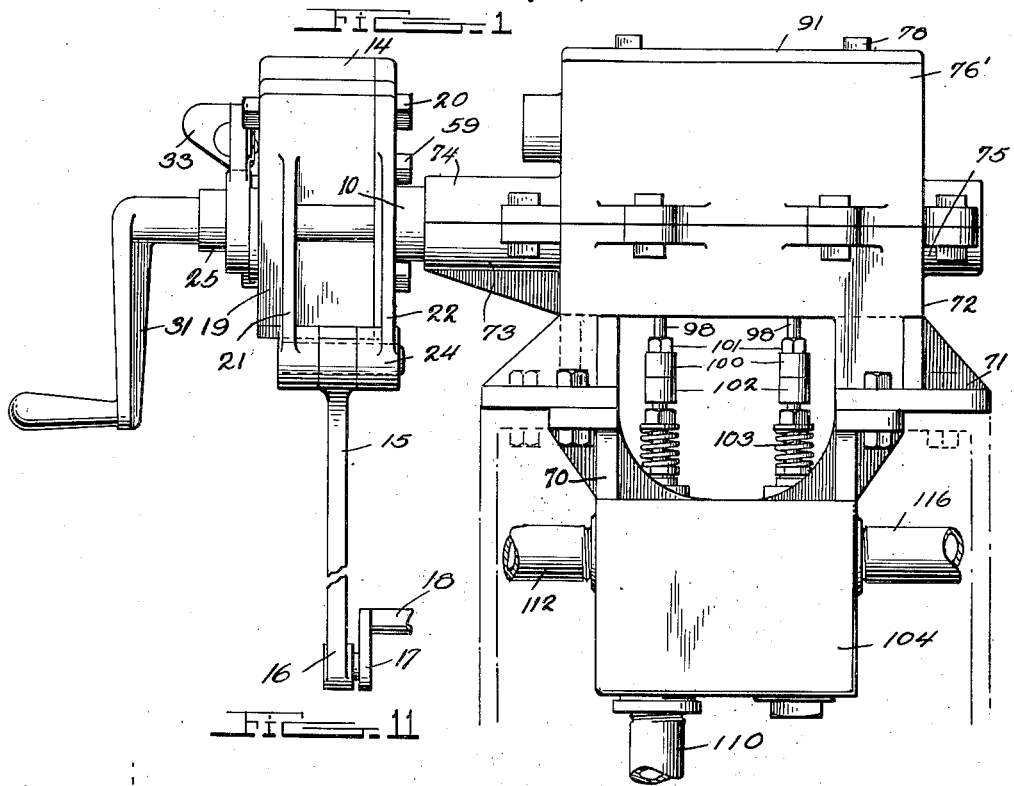
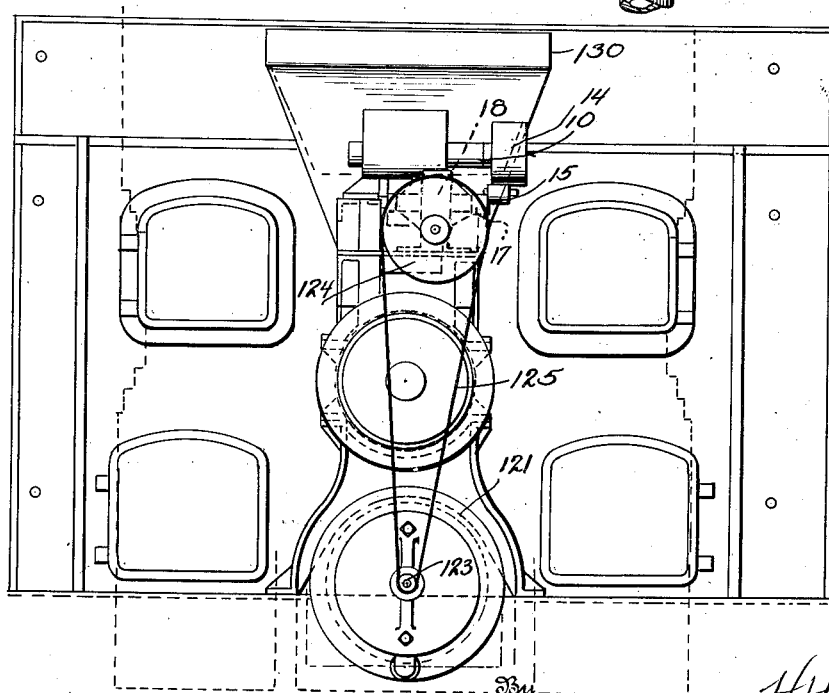
Inventor
Charles A. Warg
By H. H. Snelling
Attorney

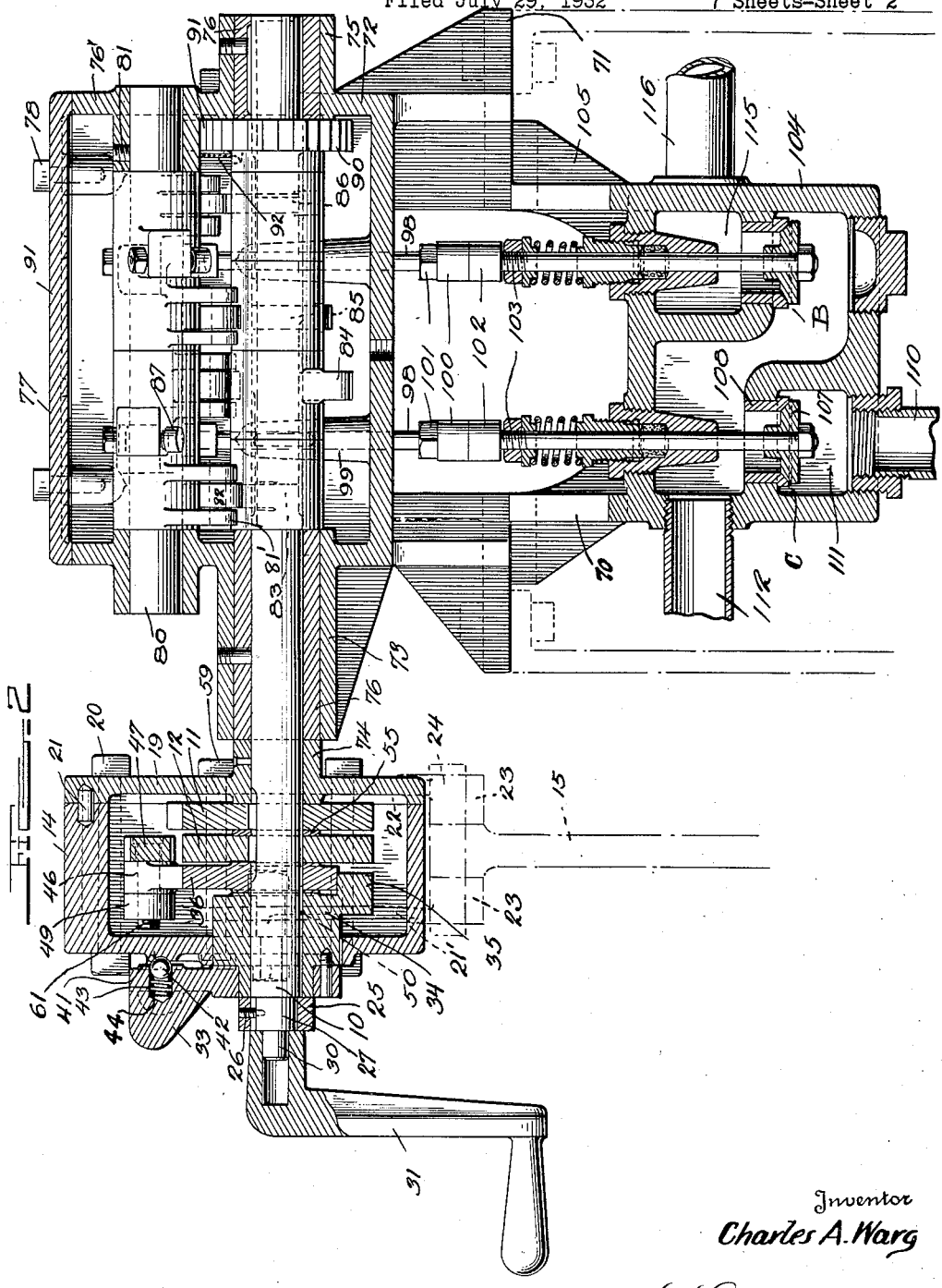

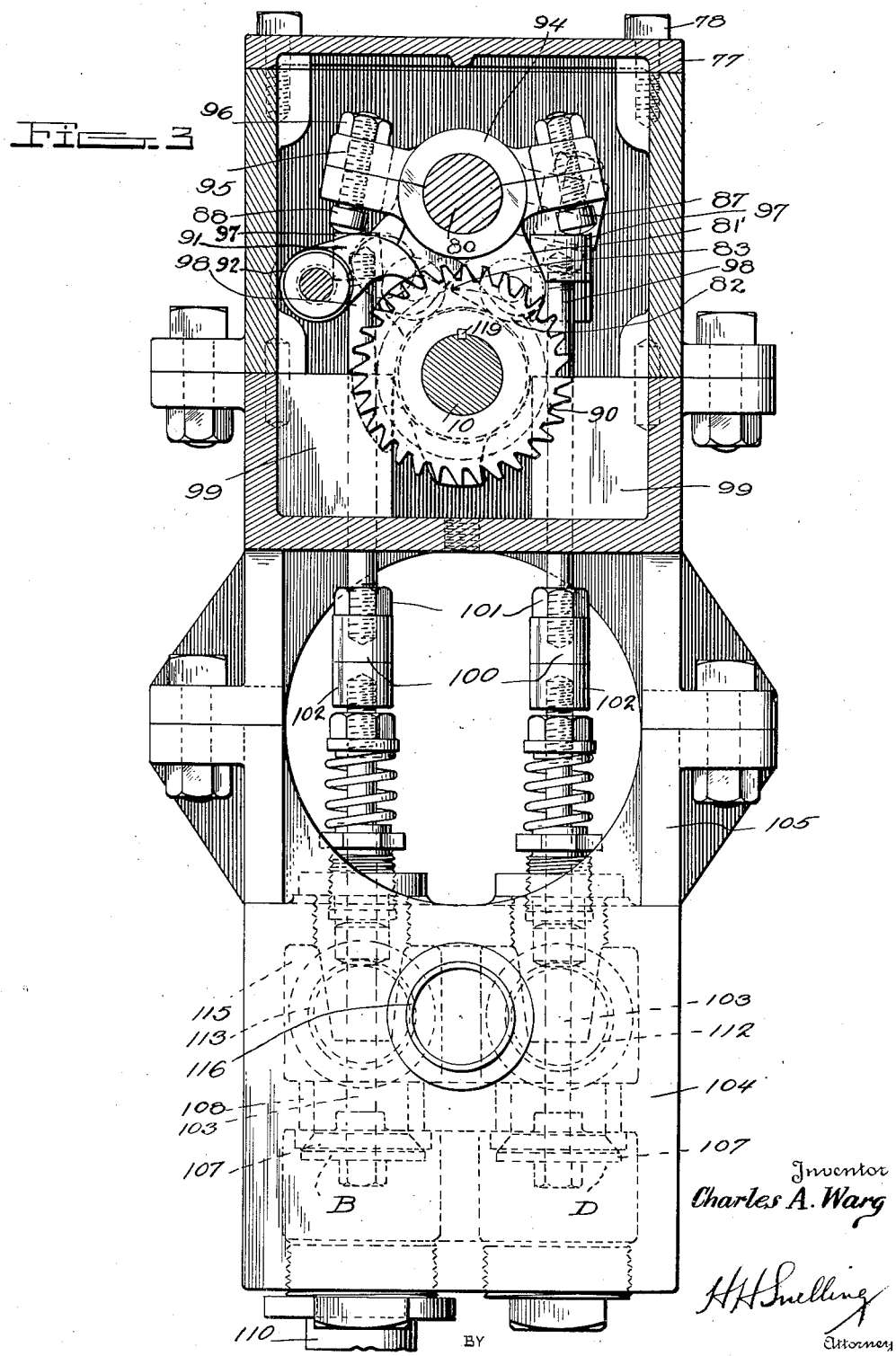

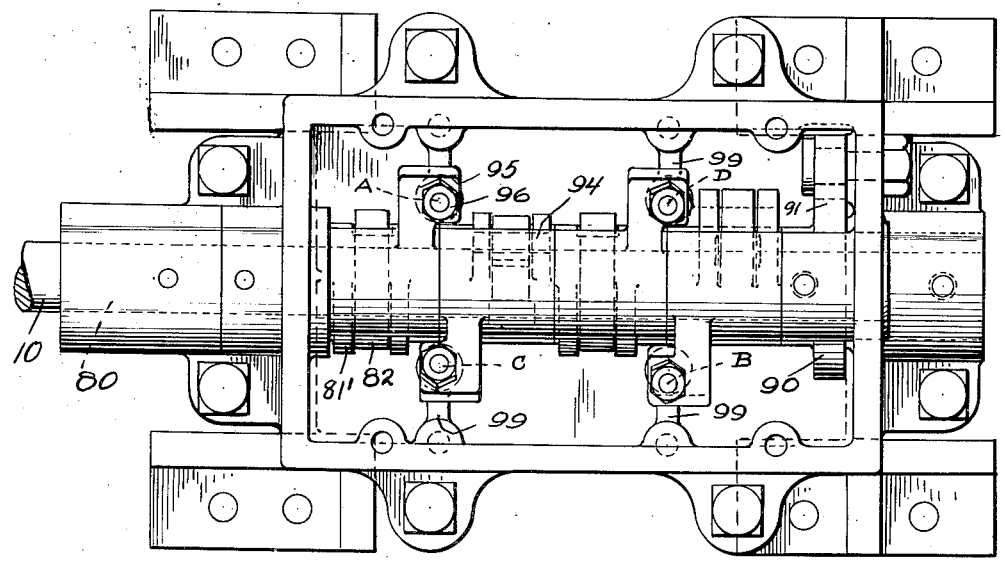
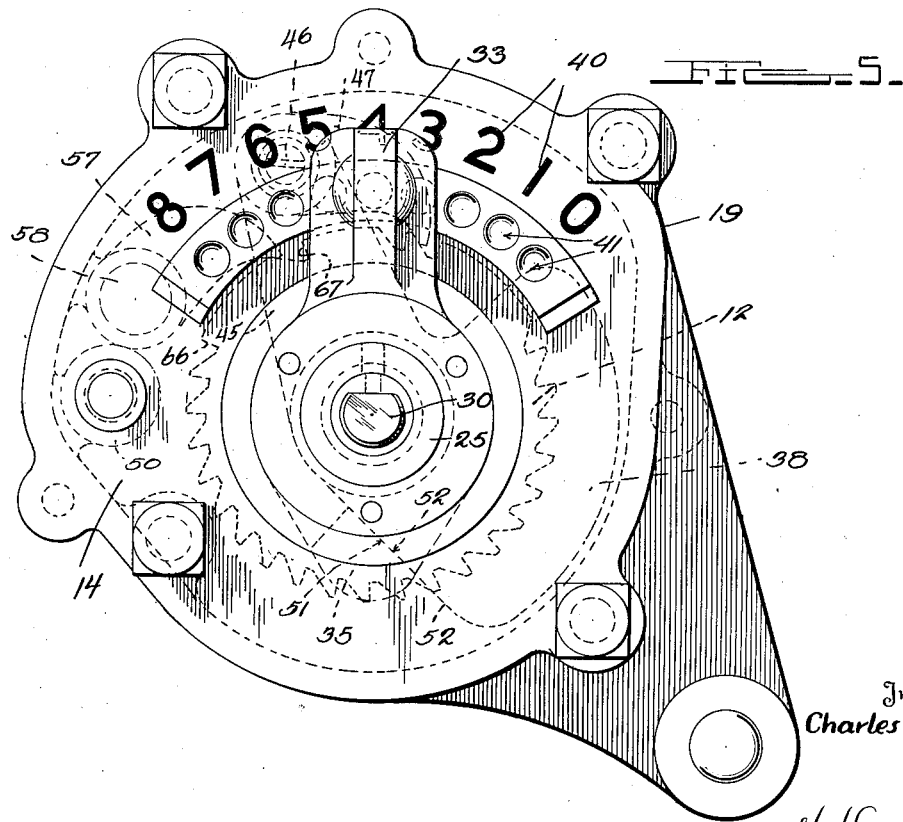

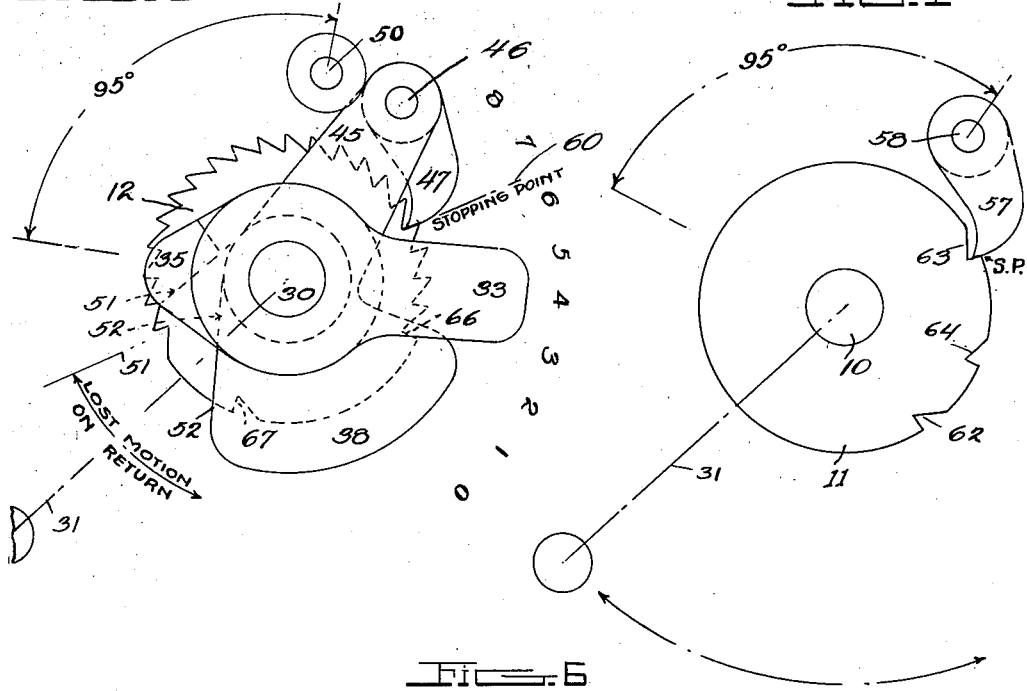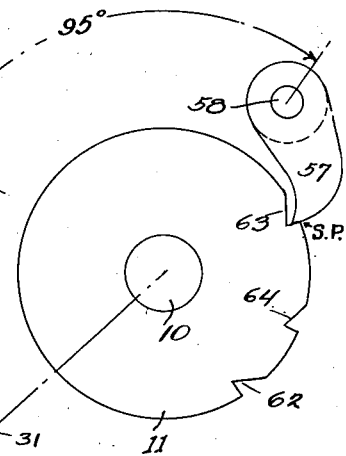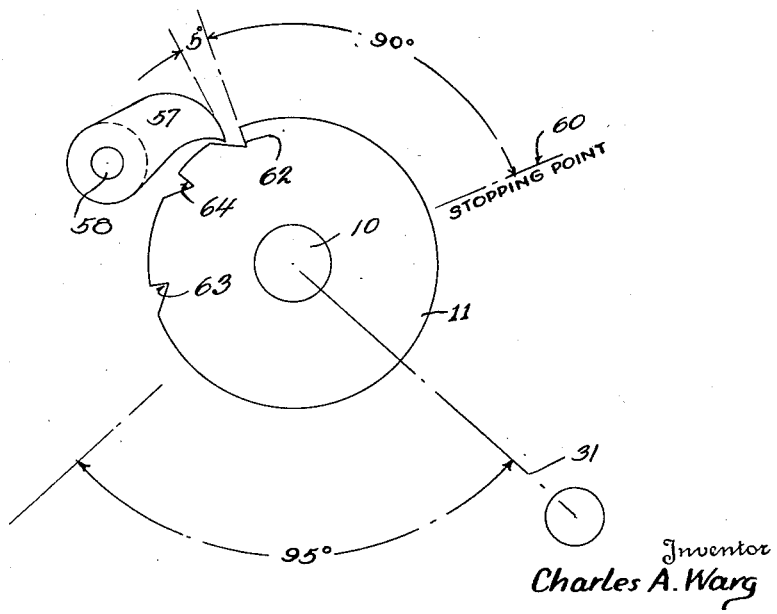

Aug. 24, 1937.                C. A. WARG                2,091,192
                            STOKER CONTROL
                        Filed July 29, 1932         7 Sheets-Sheet 6
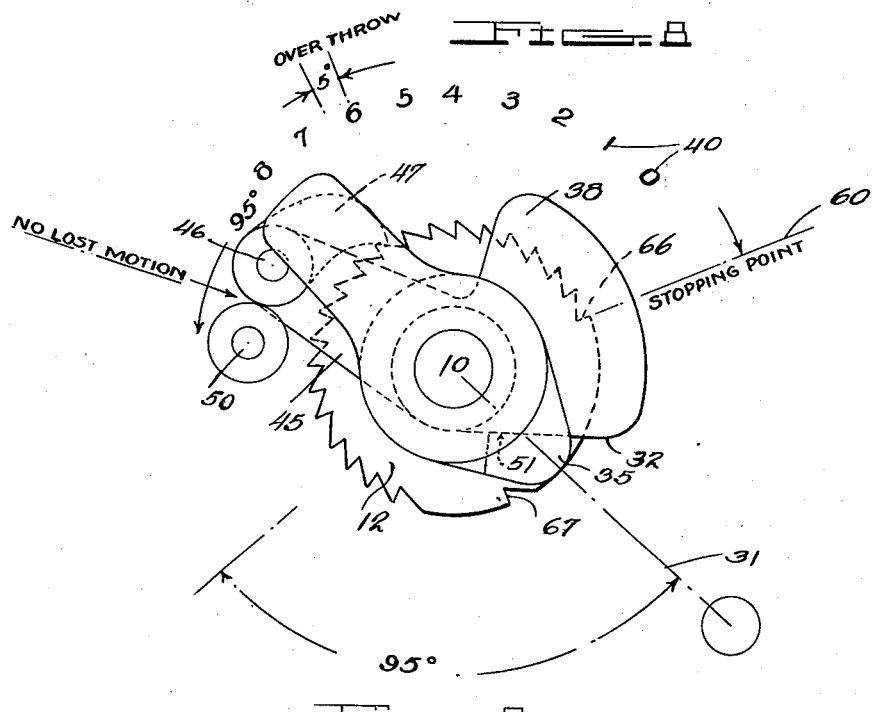
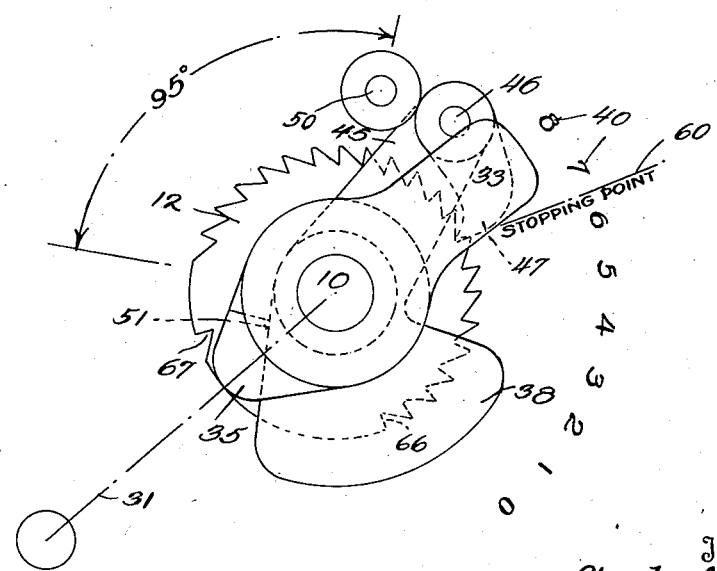
Inventor
Charles A. Warg
By H. H. Snelling
           Attorney

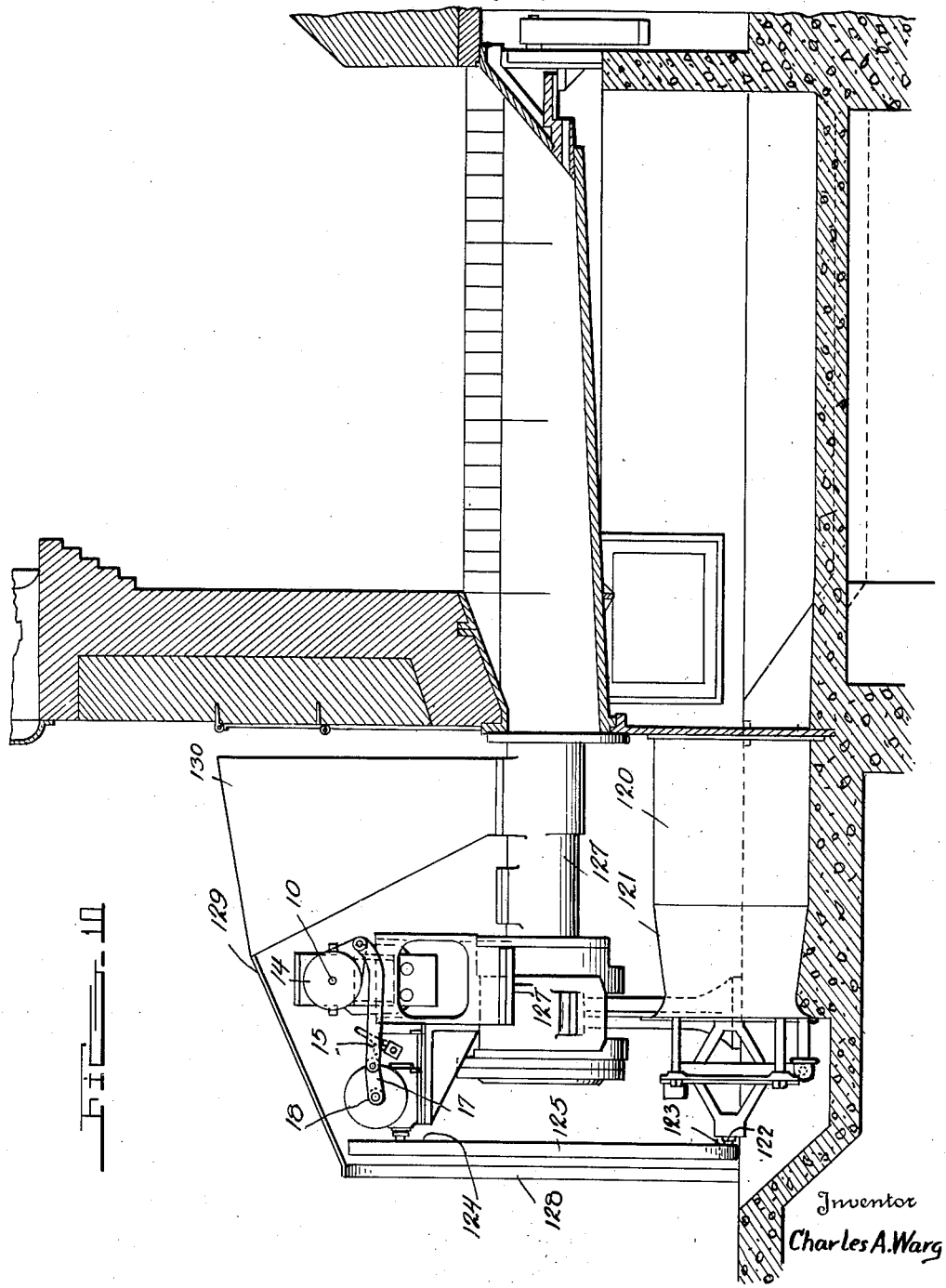

Patented Aug. 24, 1937

2,091,192

UNITED STATES PATENT OFFICE 2,091,192

STOKER CONTROL

Charles A. Warg, Scranton, Pa., assignor to McClave-Brooks Company, Scranton, Pa., a corporation of Pennsylvania Application July 29, 1932, Serial No. 626,160

23 Claims. (Cl. 121—127)

This invention relates generally to means for driving a fluid operated reciprocating member in periodic relation to the varying speed of revolution of a revolving member which latter is controlled by a fluctuating factor. Specifically the invention relates to means for driving a steam operated reciprocating stoker ram so as to feed solid fuel into a furnace in definite relation to the fluctuating speed of a blower fan which in turn is controlled by the steam pressure of the boiler, speeding up when the pressure falls and slowing down when the pressure increases beyond a chosen figure.

Such devices as have been broadly described are, of course, old and have been in practical use for a great many years but the better types offer certain disadvantages and it is the principal object of the present invention to provide an interval control for a steam drive underfeed stoker which will be simple and reliable, of relatively low cost, and which will secure economy of steam consumption and floor space while giving the highly desirable ability to have rapid speed of operation of the ram in the steam cylinder while keeping the timing mechanism operating at a slow rotative speed. Inasmuch as the interval control mechanism of the present invention may be located adjacent the ram cylinder and because of the use of the poppet valves extremely prompt cut-off is provided, this yielding maximum steam economy.

In the drawings:

Figure 1 is a side elevation of the interval control associated with a cam chamber and valve chamber.

Figure 2 is a sectional view taken on line 2—2 of Figure 3.

Figure 3 is a vertical section looking into the cam chamber from a plane just free of the end wall and looking at the valve chamber from the rear.

Figure 4 is a top plan view of the cam chamber with the cover removed.

Figure 5 is an end elevation of the timing unit.

Figure 5ᵃ is a view of the counting pawl, set at "4", at the end of its stroke, having moved from the position shown in Figure 5.

Figure 6 is a diagram of the working pawl in position about to open steam valve A and exhaust valve B.

Figure 7 is a similar view after three oscillations in which position the steam valve C and the exhaust valve D are open.

Figure 8 is a view similar to Figure 5ᵃ but showing the counting pawl set at eight teeth which gives maximum speed.

Figure 9 shows the parts of Figure 8 after a single oscillation.

Figure 10 is a sectional side elevation of an installation embodying my invention.

Figure 11 is a front elevation of such installation.

The general layout is shown in Figure 1 in which 10 is the main operating shaft which has intermittent rotation always in the same direction, this movement being provided by means of ratchet wheels 11 (Figure 2) and 12 fast to the shaft 10 and receiving motion thru pawls within the timing housing 14, the latter having oscillating movement only, derived thru connecting rod 15, the far end 16 of which is connected either directly or indirectly to a crank 17 on a constantly turning shaft 18 the speed of which varies in exact accord with the speed of the fan blower shaft, for example, being connected to the latter thru reducing gearing. Any method of connecting the rod 15 so as to oscillate in accordance with the speed of the fan or with fluctuations of pressure of the boiler may be used, many available schemes being well known and old.

As the main operating shaft 10 rotates intermittently in accordance with a setting made on the timing unit the poppet steam admission valves A and C leading to the ram and the exhaust valves B and D are operated in timed sequence to deliver steam alternately to the front and rear of the ram cylinder, the ram in accordance with usual practice being fast to a plunger which latter reciprocates in a fuel passage fed by a hopper and pushes the coal into the furnace which usually would be of underfeed type. The admission valve A does not appear in the drawings but its position, as indicated in Figure 4, is directly behind valve C in Figure 2; the valves are all preferably alike. As the blast from the fan increases the speed of feeding the coal will likewise increase as is customary in such devices, producing maximum efficiency of combustion (see Figure 11).

Referring now particularly to the timing unit, Figures 1, 2 and 5, the housing 14 is composed of two portions, the smaller portion being a cover 19 secured to the main body of the housing as by the bolts and nuts 20, correct positioning being insured by the pins 21 and also by the fact that the crank arms 21' and 22 are on different pieces one on the main body of the housing and the other on the cover 19 so that incorrect assembly is impossible because the bosses 23 at the end of the crank arms 21' must aline to receive the wrist pin 24 on which the connecting rod 15 is pivoted.

The housing oscillates freely on the main shaft 10 and is held laterally in position against the body of the cam chamber by means of a collar 25 held in place on a reduced portion of the shaft 10 by a set screw 26. It is highly advisable to extend the shaft 10 beyond the reduced end 27 on which the collar is mounted in order to provide a slabbed portion 30 to receive a hand crank 31 by which the main operating shaft 10 may be moved at any time to chosen position for any purpose.

To the near or free side of the housing 14 and extending partly within the housing is a counting pawl setting arm consisting of two portions fixedly secured together, one the finger piece 33 and the other a sleeve 34 loose on the shaft 10 and having a projection 35 by means of which the adjacent counting pawl cam 36 is driven when the setting arm moves in one direction, the engagement being with the large counterbalancing portion 38 not seen in Figure 1 but well shown in Figures 5, 8 and 9.

While the two portions of the counting pawl setting arm, namely, the finger piece 33 and the sleeve 34, normally move with the rocking housing 14 of the timing unit the setting arm has manual movement relatively to the housing for the purpose of setting the device so as to operate at different speeds, the latter being indicated by the large embossed numerals 40 on the outside of the timing unit housing or case as best seen in Figure 5. The front or near face of the housing 14 is provided with a plurality of spherical recesses 41 to receive a ball 42 sliding within a bore 43 of the counting pawl setting arm and urged against the housing and into one of the recesses 41 by means of the spring 44, see Figure 2. A swinging of the counting pawl setting arm 33, 34 with respect to the numerals 40 on the face of the housing determines the number of teeth that are engaged at each reciprocation of the connecting rod 15 and housing 14 as will be explained more fully later.

The counting pawl cam 36 is an angular piece consisting of the segmental shaped counterbalance 38 and a radial arm 45, the latter carrying a bolt 46 on which is pivotally mounted the counting pawl 47 which is held by gravity against the adjacent counting disk 12 directly beneath. The pawl pivot 46 is urged to uppermost position by means of the gravity action of the counterbalance 38. On the pivoting bolt 46 carried at the free upper end of the arm 45 of the counterbalance counting pawl cam 36 is a buffer 49 which is engaged at times by the counting pawl driving boss 50 which latter always moves with the casing 14 and is preferably a roller altho it may be an integral boss. The counting pawl cam swings freely on the main shaft 10 and is held in position laterally by engagement with the counting disk 12 on the right and the sleeve 34 of the counting pawl setting arm on the left. The projection 35 has a flat face 51 which engages the flat face 52 of the counterbalance 38 as will be seen more clearly upon detailed description of the pawl functions.

Adjacent the cover 19 of the timing unit housing is the operating disk 11 previously mentioned. This disk 11 is keyed to the main operating shaft 10 and consequently moves at all times with the counting disk 12 adjacent on the left but is preferably spaced from it an appreciable distance by the washer 55. This operating disk 11 can best be seen in elevation in Figures 6 and 7 particularly in relation to the working pawl 57 which operates it. The working pawl is shown in dotted lines in Figure 5 at the left being pivoted on a countersunk stud 58 having a nut 59 (shown in Figure 1) on the outside of the cover. The working pawl 57 therefore constantly oscillates with the boss 50 which engages the counting pawl buffer 49 and with the projection 35 on the counting pawl setting arm which latter, however, can manually be made to move relatively to these other members. However, for any one setting, the parts just mentioned all move together and their movement is oscillating only, all moving with the timing unit housing 14.

It might be well at this time to describe the operation of this particular portion of the device, first assuming that the counting pawl has been set at four teeth as shown in Figure 5. The finger 33 is vertical and overlies the numeral 4 embossed on the case to indicate four teeth at each pass of the counting pawl. The oppositely disposed projection 35 is consequently directly beneath the embossed numeral 4 and is directly below the axis of the main shaft 10. This position of the projection 35 prevents the counterbalance 38 from dropping to its normal position as in Figure 5ᵃ, and consequently holds the counting pawl buffer 49 slightly to the left of the vertical center line. At such time the pawl driving boss 50 is at the extreme left as seen in Figure 5 and will have lost motion until this boss 50 engages the buffer 49 which is held on the pin 46 at the end of the counting pawl cam by means of a cotter 61.

The swing of the timing unit case is invariably ninety-five degrees, this allowing a right angle of ratchet travel plus an overthrow of five degrees. The pawl driving boss 50 invariably moves this full ninety-five degrees both forwardly and backwardly. In moving from the position shown in Figure 5 to the position shown in Figure 5ᵃ the wrist pin 24 of the connecting rod 15 moves the full ninety-five degrees as does the pawl driving boss 50, but the latter, however, has lost motion for half of its travel, that is, up to the time it engages the buffer 49 on the counting pawl cam. The last half of the movement with the driving boss in engagement with the buffer carries the counting pawl 47 forward four teeth, this pawl being on the same pivoting bolt as is the buffer 49. This movement also carries the counting pawl setting arm 33, 34 from vertical to horizontal and its projection 35 will, therefore, be seen at the extreme left and entirely out of engagement with the flat side 52 of the counterbalance 38 giving a lost motion on the return of the wrist pin 24, that is, on the return oscillation of the timing unit housing. The stopping point, denoted by the dot and dash line 60, is the same for all settings and for both pawls 47 and 57 but the angular position of the axis of the buffer 49 varies with the setting of the arm 33.

In Figures 8 and 9 the setting is made for eight teeth instead of four, the travel under such circumstances being maximum as is the speed of the shaft 10, and the pawl driving boss 50 is consequently always in contact with the buffer 49 as these two parts on travel either forward and rearward oscillate together, there being no lost motion of any kind and the flat face 51 of the setting arm 33, 34 and the corresponding flat face 52 of the counterbalance of the counting pawl cam 36 are likewise in constant engagement. The beginning of the movement is shown in Figure 8 and the end of the movement is shown in Figure 9 from which latter figure it will be noted that the parts 49 and 50 are in just the same relative positions as in Figure 5ᵃ but the setting arm in Figure 5ᵃ is horizontal allowing for the lost motion on return whereas there is no lost motion in Figure 9.

Referring now particularly to Figure 6, the operating disk 11 is shown in such position that one of the steam valves (A) (see also Figure 4) is about to open as is the exhaust valve corresponding to the other steam valve (C). The working pawl 57, as will be remembered, is mounted on a stud 58 carried by the timing unit housing and the disk 11 is keyed to the shaft 10, consequently as the housing moves in its oscillation of ninety-five degrees, the working pawl 57 will engage the first tooth 62; the first five degrees of travel being taken up by the overthrow and the remaining right angle rotating the operating disk 11 and with it the main shaft 10, the latter causing the simultaneous opening of the steam valve A and the exhaust valve B.

In Figure 7 the working pawl pivot 58 has moved thru two forward, i. e., clockwise oscillations, and one return or counterclockwise oscillation, each of ninety-five degrees. The first forward movement carried the disk ninety degrees and opened the steam valve A and the exhaust valve B. The return reciprocation left the valves A and B open. The next forward movement of the working pawl, which this time engaged the third tooth 63 and not the first tooth 62, closed the valves A and B and opened the steam valve C and the exhaust valve D both to be described later. In Figure 7 the steam valve C and the exhaust valve D are both open but they will be closed by later movement of the counting pawl, it being remembered that both the operating disk and the counting disk are keyed together on the operating shaft so that both invariably move as a unit. The third notch or tooth 63 is engaged after the shaft 10 has been rotated by the counting pawl 47 insuring a complete cycle for each revolution of the shaft 10.

The position of the shaft 10 in Figure 8 is about 180° from the position of the shaft in Figure 6, the former figure showing movement of the shaft due solely to the counting pawl 47 and the counting disk 12 whatever the setting. The number of oscillations of the timing unit housing 14 to a single revolution of the main shaft 10, that is, to a complete cycle, varies from 19 at setting No. 1, 11 at 2, 8 at 3, and so on down to four oscillations for a complete cycle when set at 8. At all settings, except at No. 7, the number of oscillations is a whole number but when the setting is at 7 the oscillations will alternate four and then five, for example beginning in Figure 6 which shows the initial position for all settings, the first oscillation, no matter what the setting, will carry the first tooth 62 on the operating disk to the stopping point 60 and will open valves A and B. The second forward reciprocation of the working pawl will bring the second tooth 64 of the counting disk 12 to the stopping position 60 if the setting is at 8 but if the setting is for 7 or any smaller figure the third tooth 63 of the working or operating disk 11 (which is alined with the first tooth of the counting disk) is brought to stopping position, in either case closing valves A and B and opening and leaving open valves C and D giving the idle or return stroke of the ram of the stoker.

The next oscillation will advance the shaft 10 only thru the counting pawl 47 since from this point to the completion of the cycle the working pawl 57 is on the large smooth periphery of the operating disk which has only the three teeth whereas the counting disk has twenty-two. Valves C and D are closed about midway of this oscillation. Still assuming that the setting is for seven, the eighth tooth of disk 12 will be engaged by the counting pawl and will be carried to position 60. On the next stroke the fifteenth tooth will be carried to the stopping point and on the next stroke the twenty-first tooth, which is the last regular tooth, will be carried to the stopping point 60. This completes the cycle and carries the shaft 10 about 40° beyond the initial point, so on the beginning of the next cycle the middle tooth 64 of the operating disk is engaged by the pawl 57, the counting pawl at this time engaging a smooth surface. Four oscillations now bring the mechanism to the initial position shown in Figure 6.

The twenty-second tooth 67 is necessary for only one setting, and its function is to prevent loss of a half stroke, it also being the desire that the cycle shall be completed at each revolution of the shaft. It is, therefore, possible to alter the setting at any time irrespective of the position of the shaft 10 as upon the next few oscillations, the pawls will be brought into the initial position shown in Figure 6. This tends to make the device quite foolproof and eliminates serious disadvantages present in other devices of the character. The zero setting follows usual practice and prevents any movement of the ratchet wheel, the lost motion taking the entire stroke.

Considering now the cam chamber: As will be noted in Figures 1, 2, and 3 this chamber supports the entire device by virtue of the carrier frame 70 to which are bolted the four extended legs 71 integral with the bottom half 72 of the cam chamber housing. Referring particularly to Figure 2 it is seen that this bottom half has a semi-cylindrical projecting boss 73 and an opposite boss 75 each having therein a bushing 76 to receive and guide the main operating shaft 10 which extends entirely thru the housing; the bushing 76 abuts the timing housing boss 74.

The upper half 76' of the cam housing provides the other halves of the bosses 73 and 75 and is entirely open at the top allowing for a large one piece cover 77 held by the cap screws 78 and affording complete access to the mechanism within the chamber for convenient adjustment. It will be noted that the housing consists of two detachable sections 72 and 76' separated horizontally in line with the axis of the shaft, the lower section 72 of said housing forming an oil reservoir in which the cams are emersed at each revolution of the shaft. In the upper half of the housing is mounted a bell crank shaft 80 preferably fixed in position as by the set screws 81. This bell crank shaft 80 carries loosely four rocking sections preferably identical but reversely arranged, each being in the nature of a bell crank and having a pair of extending spaced lugs 81' in which are pivoted cam rollers 82 each roller being individually operated by a single cam numbered 83, 84, 85 or 86 corresponding respectively to the steam admission valve A, the steam admission valve C, the exhaust valve D and the exhaust valve B, these cams running in A, B, D, C order counterclockwise about the shaft 10 as seen in Figure 3 from which figure it will be noted that the cam roller 82 when moved to the right will depress not the adjacent push rod adjusting bolt 87 shown in full lines in Figures 2 and 3 but will operate the similar bolt 88 which is hidden in Figure 2 but shown in full lines at the left in Figure 3. The four cams are each keyed to the shaft in correct position and inaccuracy of action is further avoided by providing the holding wheel 90 likewise keyed to the shaft and held against retrograde movement by means of a holding pawl 91 pivoted on a stud 92 carried by the housing and gravity operated.

Having particular reference to Figure 3 the four bell cranks each bear the numeral 94 having in addition to the lugs 81' an arm 95 threaded to receive the push rod adjusting bolt 87 or 88 which after being correctly adjusted is locked into position by the nut 96. Upon oscillation of a bell crank 94 by engagement of its cam as for example 83 with the bell crank roller 82, the push rod adjacent bolt on the opposite side descends, its domed head engaging the flat upper portion of a push rod cap 97 non-adjustably mounted at the top of push rod 98 which has a long sliding engagement in a sleeve 99 preferably integral with the lower half 72 of the cam chamber casing. Adjustment of the push rod is secured by means of the lower push rod cap 100 which after being positioned correctly on the rod is locked in place by a jam nut 101. Obviously this adjustability, while helpful, is not essential as the valve stem cap 102 at the head of the valve stem 103 is also adjustable.

Considering now particularly the valve chamber housing 104 this body has upwardly extending brackets 105 by means of which the valve chamber housing is secured to the flanged feet 71 of the cam chamber housing, the valve chamber therefore being directly carried by the cam chamber above. The valves 107 are all poppet type each seating within a valve bushing 108 in the body of the valve chamber. The specific details of the valve mechanism form no part of the present invention and are, therefore, not described in detail. Steam is admitted thru pipe 110 passing to the steam chamber 111 in which both valves A and C open, the pipe opening directly beneath the latter which is the left hand valve in Figure 1, the valve on the right being exhaust valve B.

The steam chamber 111 opens individually to pipes 112 and 113 each leading to the ram but on opposite ends, steam valve C admitting steam thru pipe 112 to the front of the ram cylinder for the return stroke while the corresponding steam valve A admits steam to the rear of the ram cylinder thru pipe 113 for the forward or working stroke of the ram. Obviously whenever desired the pipes may be reversed and the steam valve A will then admit steam to the front of the cylinder thru pipe 112 for the idle or return stroke of the ram, which will then remain at the other end of the stroke during the idle period of the cycle. The exhaust chamber 115, like the steam chamber, is common to the two exhaust valves B and D and both, therefore, discharge thru pipe 116 which preferably leads to the ash pit of the furnace. Valves B and C, both shown in Figure 2, do not operate together but exhaust valve D opens simultaneously with the steam valve C as can readily be seen from the location of the cams in Figure 3 and exhaust valve B, shown in this figure, opens at the same time as steam valve A, which in the figure is hidden by valve C.

Inasmuch as it is not at all essential that the timing unit shall be located anywhere near the fan the valve chamber in this mechanism can be placed as close as may be desired to the ram cylinder making the pipes 112 and 113 very short which economizes steam consumption, causes a quick start and stop of the ram cylinder without any appreciable lag which lag or delay is very noticeable in other types of interval control mechanism, and also permits as fast a movement as may be desired of the fuel feeding plunger operated by the ram while still giving as slow a movement of the main shaft 10 as may be desired. While the main shaft 10 might operate a rotary valve, as is common in the prior art, the quick and positive action of the poppet valves makes the present structure appreciably better and I much prefer these poppet valves.

The operation of the device will be given assuming the shaft 10 to be at the beginning of the cycle, namely, with the counting pawl driving boss 50 at the left as seen in Figure 5, the working pawl 57 at the angle shown in Figure 6 and the counting pawl 47 in a position which varies with the chosen setting, i. e., the counting pawl may be under the embossed zero, 45° to the right of the center in Figure 5, or it may be under the embossed numeral 8, forty-five degrees to the left of the center line. The shaft 10 at such time is in such postion that the key 119 of the various cams is directly up and the four cams 83 to 86 are therefore in the positions shown in Figure 3. The first ninety degrees of movement, irrespective of the setting, turns the cam key 119 thru a right angle placing it on the extreme right as seen in Figure 3. This movement turns the cams a quarter of a revolution, depressing the exhaust valve B and simultaneously depressing steam admission valve A, the latter admitting steam to the rear end of the ram cylinder. This is the working stroke and causes the ram to push coal from the hopper forwardly thru the fuel passage into the retort of the stoker. The timing unit housing 14 oscillates by rearward movement of the wrist pin 24 causing no motion of the operating shaft 10 which is held by engagement of the pawl 91 with the holding wheel 90 which is adjacent the far boss 75. On the next forward stroke the working pawl 57 again advances the main operating shaft 10 nearly a full quarter revolution bringing the third tooth 63 of the operating disk 11 to the stopping point 69, closing valves A and B while opening valves C and D for the start of the return stroke of the fuel feeding ram of the stoker. The next reverse oscillation of the timing unit 14 has no effect on the main shaft 10 but upon the following working stroke of the timing unit housing the shaft is advanced by the counting pawl 47 and counting disk 12, this action closing both the steam admission valve C and the exhaust valve D. The ram cylinder and the coal feeding plunger therefore remain in forward position thru one or more oscillations depending upon the setting of the counting pawl setting arm 33. No matter what the setting (except No. 7, the description of which has already been completed) a given number of full oscillations will always bring the main operating shaft 10 to initial position shown in Figure 6, ready for the working stroke of the fuel feeding plunger to be brought about by movement of the working pawl 57, or, in case the pipes are reversed as suggested, ready for the working stroke.

In Figures 10 and 11 I have shown an installation embodying the invention in a somewhat more compact form, the principle being exactly the same. In the particular installation shown the air duct is 120 and the turbine blower is 121, the shaft 122 of which thru a small pulley 123 and a belt 125 drives the very much larger pulley 124 on the shaft of a reduction gear, the outlet shaft of which is numbered 18, being the previously mentioned "constantly turning shaft", the speed of which varies in exact accord with the speed of the fan blower shaft. In this particular installation a considerable saving in space is had by mounting the units in the positions shown and keeping the unit very compact. The turbine blower, it will be noted, is directly beneath the ram cylinder 127 and the shaft 122 of the blower is extended in order that the pulley 123 shall be approximately directly below the pulley 124. The unit is protected with a guard 128 and it is preferable to add a sheet metal plate 129 over the poppet valve unit and extending from the hopper 130 to the guard 128. The particular assembly illustrated insures the correct relation between the supply of air and the supply of fuel since the forced draft blower and the poppet valve unit are both operated from the single steam turbine which latter in turn, being a part of the forced draft blower, is controlled automatically by a steam regulator and a balanced valve actuated by variations in the steam pressure.

What I claim is:

1. In combination, a main shaft, a plurality of ratchet wheels keyed on said shaft, a rocker loosely mounted on said shaft, means for oscillating the rocker over a chosen arc, means cooperating with the rocker and with the ratchet wheels for transmitting a chosen portion of the arc of motion of the rocker to said shaft to cause the shaft to turn only in one direction and by chosen increments of rotation, a plurality of cams on said shaft, a plurality of poppet valves and means associated with said cams for operating all of said valves in timed sequence from said cams during rotation of said shaft through an arc corresponding to the arc of oscillation of said rocker.

2. In combination a main shaft, a plurality of ratchet wheels fixedly mounted on said shaft, a housing enclosing said wheels and loosely mounted to rock on said shaft, means for continuously oscillating the housing over a chosen arc, means carried in part by the housing and in part by the shaft for transmitting a portion of the motion of the housing to the shaft to cause the shaft to turn only in one direction by chosen increments of rotation, a plurality of cams on said shaft, a plurality of poppet valves and means for operating said poppet valves in timed sequence from said cams.

3. The combination of claim 2 in which the housing consists of two parts, each of which has a crank extension forming part of said oscillating means, said extensions being spaced to receive between them a reciprocating connecting rod, said rod being included in said oscillating means.

4. In a device for controlling the flow of fluid thru a plurality of pipes, a main shaft, a rocker loosely mounted on said shaft, means for oscillating said rocker, an operating disk fast to said shaft, a counting disk also fast to said shaft to turn at all times with said operating disk, a cam loosely mounted on said shaft and carrying a pawl engaging said counting disk, a working pawl carried by the rocker and engaging said operating disk, means movable with said rocker for operating said cam, and additional means carried by said rocker and manually adjustable with respect thereto for moving said cam, a plurality of valves for admitting fluid to and exhausting fluid from said pipes, and mechanism connecting said valves to said shaft for timed operation of said valves by movement of said rocker.

5. The device of claim 4 in which the arc of rocker oscillation is about 90° and a cycle of operations of the valves is initiated with a right angular movement of said shaft irrespective of the setting of said manually movable member, teeth on said operating disc cooperating with said working pawl to cause said right angular movement of the shaft.

6. The device of claim 4 in which the third oscillation of the rocker causes a movement of the shaft thru approximately a right angle so as to open the valves for the return stroke irrespective of the setting of the manually movable member.

7. The device of claim 4 in which the first oscillation of the rocker rotates the shaft thru a chosen angle opening the valves to admit fluid to some of said pipes, the second oscillation produces no movement of the main shaft and the third oscillation closes the previously opened valves and opens other valves to admit fluid to other of said pipes irrespective of the setting of the manually operated member.

8. The device of claim 4 in which the manually movable member is settable to a plurality of chosen positions each causing the advance of the shaft thru a different angle and the mechanism connecting the valves with the shaft consists of a plurality of cams, said cam being positioned on the shaft in such angular relation as to cause some of said valves to open upon the first oscillation of the rocker, to open other of said valves and close the first opened valves on the third oscillation of the rocker and to close the said other valves while simultaneously opening the first opened valves upon a further number of oscillations of the rocker arm dependent upon the setting of the manually movable member.

9. In a timing unit, a main shaft, a rocker loosely mounted on said shaft and carrying a working pawl, a setting arm loosely mounted on said shaft and manually movable with respect to said rocker, a cam loosely mounted on said shaft adjacent said setting arm, a counting pawl carried by said cam, a gravity counterbalance on said cam for holding said pawl in elevated position, a counting disk secured to said shaft and lying in the path of said counting pawl, an operating disk secured to said shaft and lying in the path of the working pawl on the rocker, a projection on said setting arm for engaging said cam, and means carried by said rocker for engaging said cam to cause said counting pawl to move with said counting disk.

10. The device of claim 9 in which the rocker is a housing enclosing and protecting said pawls, said disks, and said cam.

11. The device of claim 9 in which the rocker is a housing surrounding said disks and said cam and the setting arm is loosely mounted on the main shaft and extending within and outside of said rocker housing.

12. The device of claim 9 in which the operating disk has three teeth spaced within an angle of less than 180°, the counting pawl has a plurality of teeth one of which is alined with one of the teeth on the operating disk and the number of settings of the setting arm is such that the main shaft will make one complete cycle for a complete number of oscillations of the rocker irrespective of its settings, the number of such settings being in excess of four.

13. The device of claim 9 in which the operating disk has three teeth spaced within an angle of 90° and the remaining 270° of the operating disk is smooth, the teeth on the counting disk correspond with the smooth periphery of the operating disk and the first tooth on the counting disk corresponds with the third tooth on the operating disk whereby the first oscillation in any cycle irrespective of setting will advance the shaft thru 90°, the third oscillation of the rocker at any setting will advance the shaft thru a second 90° and the remaining 180° of travel will be caused by varying numbers of oscillations dependent upon the setting of the setting arm.

14. In an interval control device, a timing unit, a valve controlling cam mechanism, a housing for said timing unit, a two part housing surrounding said cam mechanism, a single shaft passing through the timing unit and the cam mechanism and journaled in said two part housing, said shaft constituting the sole support for the timing unit and its housing, journals for said shaft separably carried by said two part housing whereby removal of one part of the housing permits lifting of said shaft from the other part of the housing, said housings being relatively movable.

15. In combination, an intermittently driven shaft, a bell crank shaft parallel thereto, a plurality of cams angularly spaced about said driven shaft, a plurality of bell cranks independently movable on said bell crank shaft for operation by said cams and a housing surrounding said bell cranks, said cams and said shafts, said housing including two detachable sections separated horizontally in line with the axis of the driven shaft, the lower section of said housing forming an oil reservoir in which the cams are emersed at each revolution of the driven shaft, said bell crank shaft being journaled in the upper section and removable therewith to permit free access to and removal of the intermittently driven shaft.

16. A counterbalanced pawl carrier for a timing mechanism consisting of a central portion having a circular recess therein for loosely mounting upon an operating shaft, a radial arm extending from said central portion, a segmental counterbalance extending from said central portion at an obtuse angle from said radial arm and a counting pawl pivoted near the extremity of said radial arm.

17. The device of claim 16 plus a cylindrical member mounted coaxially with said pawl on said radial arm.

18. A counting pawl setting arm for a timing unit consisting of an elongated cylindrical member, a radial arm extending from one end of said member and carrying a detent and a projection extending from the member diametrically and laterally opposite from said radial arm.

19. In a timing unit of the type adapted to be carried by the operating shaft which it controls, a rocking housing having a central shaft rotatably mounted on said shaft, a sleeve rotatably mounted on said shaft and rotatably projecting within said housing, a radial arm on said sleeve extending parallel to one face of said housing, detent mechanism carried in part by said housing and said arm, and a projection on said sleeve extending inwardly within said housing beyond said sleeve.

20. In an interval control device, a timing unit, a plurality of valves, a valve controlling cam mechanism, a housing for said timing unit, a housing for said valves, a housing for said cam mechanism supported on the valve housing, and a single shaft passing thru the timing unit and the cam mechanism, said timing unit and its housing being supported solely by said shaft, and said timing unit housing being movable relative to the shaft and to the cam mechanism.

21. In combination, a timing unit and a horizontal cam shaft operated thereby, said unit being supported by the shaft, a housing for said shaft comprising an upper part and a lower part joined together along a horizontal plane thru the shaft axis, and a bell crank shaft in the upper part and journaled in the end walls thereof and carrying bell cranks in operative engagement with the cam shaft.

22. A cam shaft timer unit of the type adapted to be carried by the cam shaft and forming a part of the linkage used for transmitting motion to the cam shaft comprising a central shaft, a plurality of ratchet gears mounted on the central shaft, a pawl arm loosely mounted on the shaft adjacent one of said gears, a pawl on said arm for engaging the teeth in said one gear, gravity means tending to hold said arm in substantially upright position, a housing enclosing said gears and said arm and pivotally mounted on said central shaft, a pawl on the inner wall of said housing for engaging the teeth of the other of said ratchet gears, a projection on said inner wall for engaging said arm, means for oscillating said housing thru a fixed arc, a setting arm pivotally mounted on said shaft and having adjustable engagement with said housing whereby its arc of travel may be changed with respect to the arc of travel of the housing and means rigidly connected to said setting arm and having engagement with said pawl arm for changing the arc of travel of said arm with respect to the fixed arc of travel of said housing.

23. The device of claim 22 in which said housing consists of two parts and in which the pawl on the inner wall is carried on one part and the projection is carried on the other part, said other part when disconnected from the one part being axially movable to expose the gear wheels and said pawl arm and said setting arm being axially movable with said other part.

CHARLES A. WARG.